Jan. 23, 1968  V. BILAISIS  3,364,875
TRAINING DEVICE FOR TEACHING THE ART OF SKIING
Filed Jan. 7, 1965  4 Sheets-Sheet 4

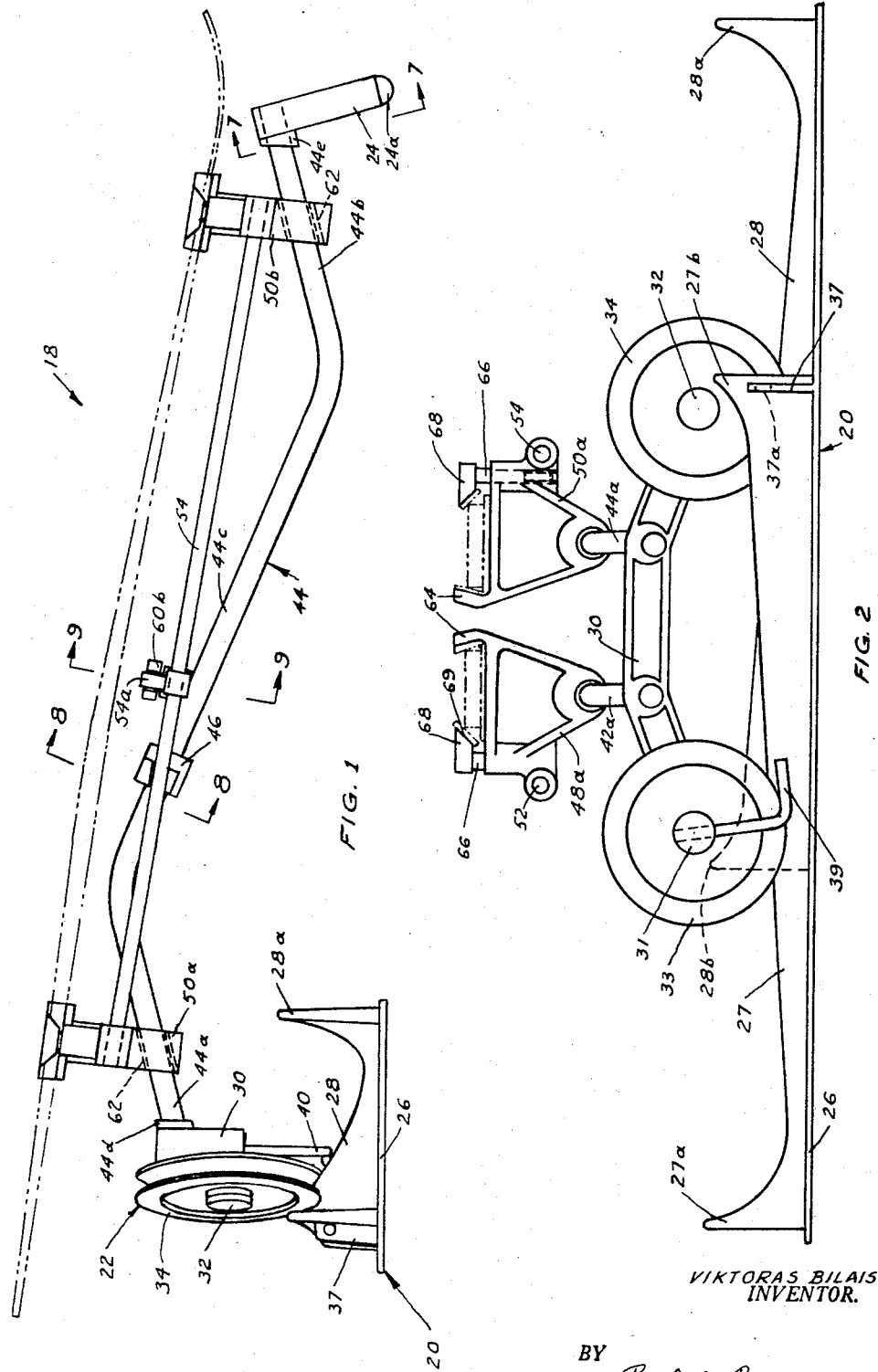

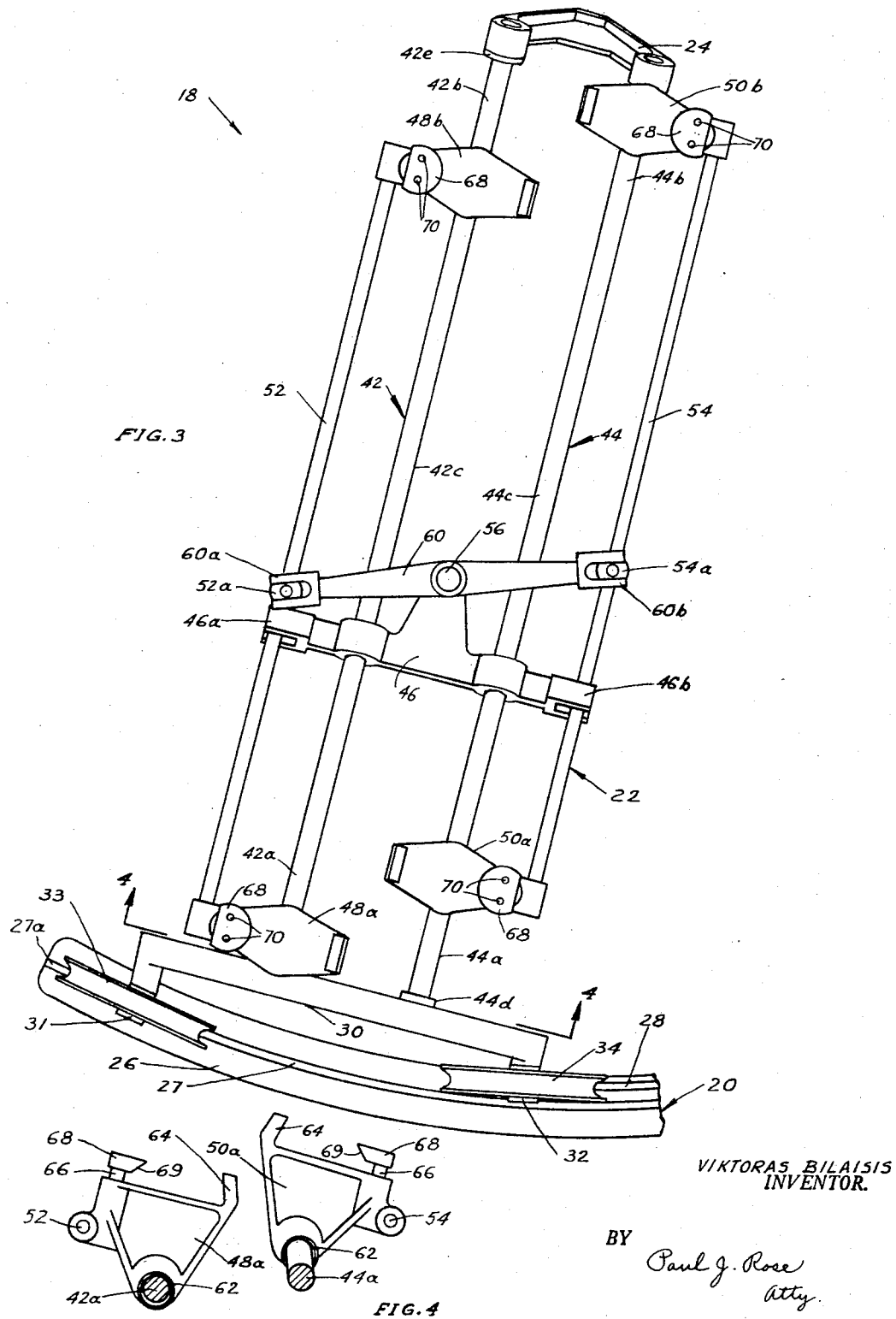

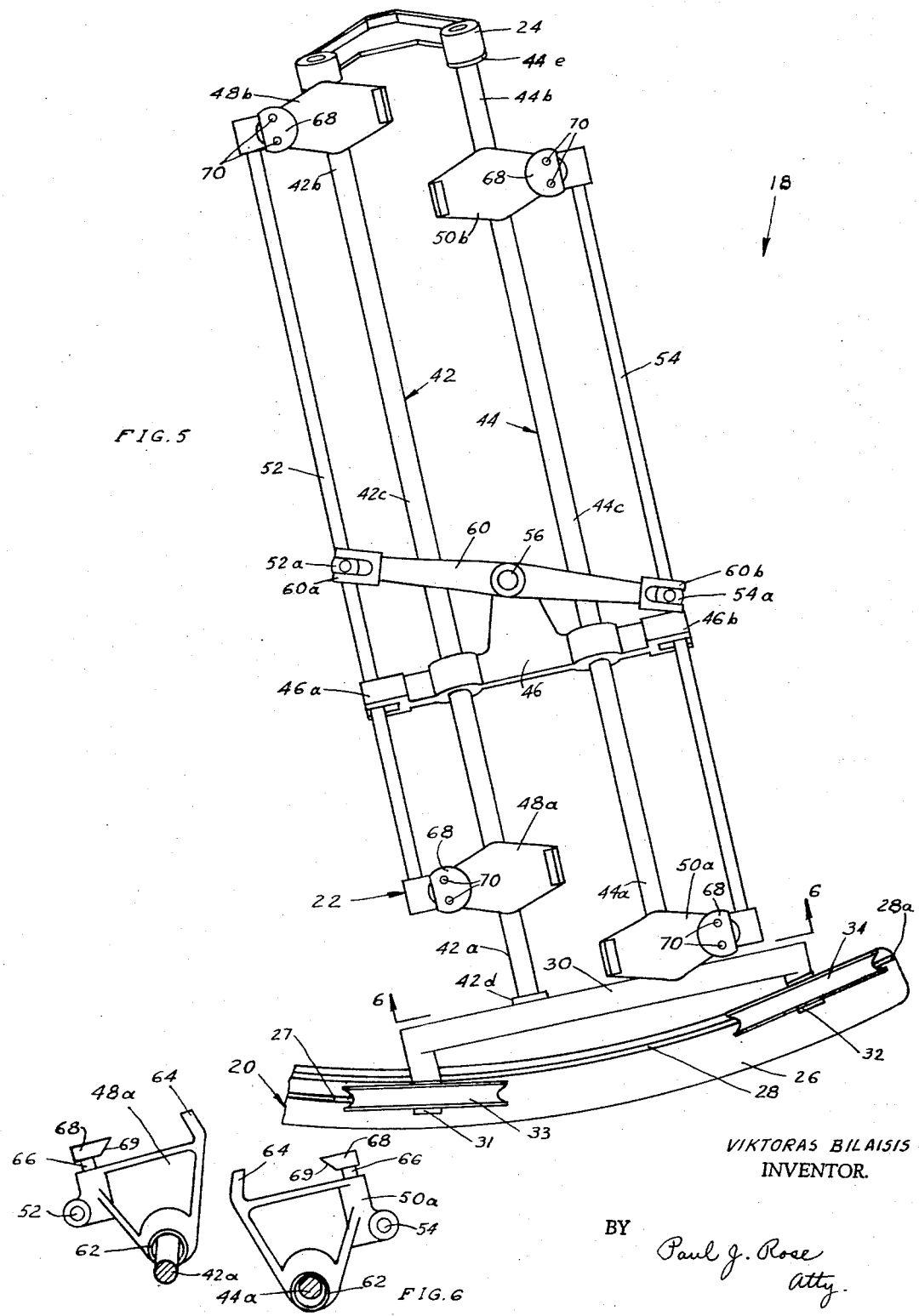

VIKTORAS BILAISIS
INVENTOR.

BY
Paul J. Rose
atty.

United States Patent Office 3,364,875
Patented Jan. 23, 1968

3,364,875
TRAINING DEVICE FOR TEACHING
THE ART OF SKIING
Viktoras Bilaisis, 7355 S. Sacramento,
Chicago, Ill. 60629
Filed Jan. 7, 1965, Ser. No. 423,959
40 Claims. (Cl. 104—173)

This invention relates to a training device for teaching the art of skiing.

It is well known that skiing is the most exhilarating outdoor sport in the world. However, it is intrinsically difficult to learn how to ski by actual practice, and another impediment to learning how to ski is that in most sections of the country the skiing season is very short. Beginning skiers become discouraged when there are only a few weekends in a year to practice.

The ultimate goal of every skier is to be able to turn relatively sharply from side to side in S-curve fashion while going down a long slope. Such turning may be carried out to avoid obstacles, but it is also necessary to the maintaining of control and balance, and it requires a number of perfectly coordinated body motions, such as changing the lead ski, placing the inside pole into the snow, lifting the body weight off the skis temporarily, turning the lower part of the body from the waist down edging the skis to stop sidewise sliding motion, etc. To learn the proper coordination on the ski slope is difficult because the fast speed and the normally uneven terrain leave little time to think of the proper body motions. Therefore, the body motions must be practically automatic and instinctive before fluid and graceful turns can be executed without tipping over.

The device of my invention enables a would-be skier to learn all the proper body motions in his home at his convenience and to practice all year round during off-season periods, in sections of the country where the skiing season is short. He can learn to coordinate two of the required body movements at a time and then add others one at a time until he learns to do all of them together. If he desires, he can at first hold onto a table to help maintain his balance until he learns to balance without such aid. Experienced skiers can also use the device of my invention to "warm up" before going on a ski run.

Prior to my invention, to my knowledge there were no such training devices for teaching the art of skiing. Accordingly, it is an object of my invention to provide a training device for teaching the art of skiing.

FIG. 1 is a side elevational view of a training device constructed in accordance with my invention, the carriage being shown midway between its extreme positions, and the ski support members being shown midway between their extreme frontward and rearward positions;

FIG. 2 is a rear elevational view of the device of FIG. 1, certain portions being omitted in the interest of clarity;

Figure 7:
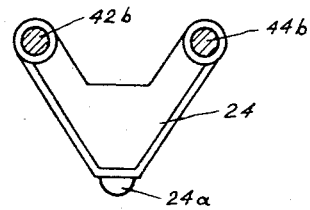
Figure 8:
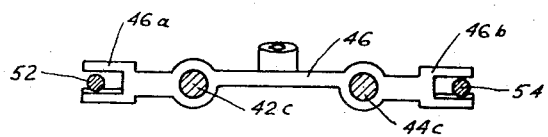
Figure 9:
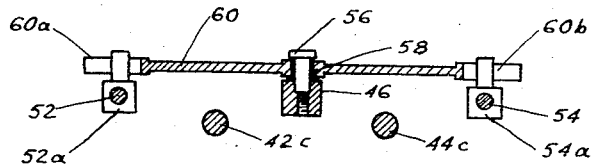
Figure 9A:
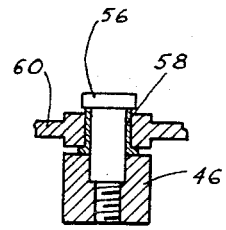
Figure 11:
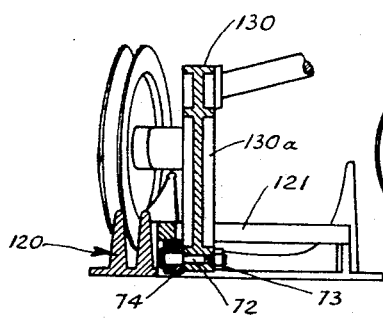
Figure 10:
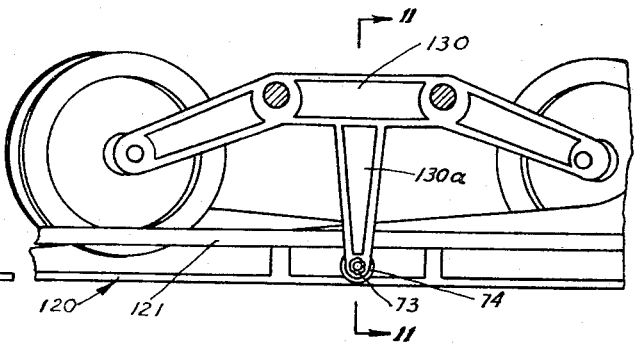

FIG. 3 is a top view of the device of FIG. 1, the carriage being shown in its extreme leftward position, the two right ski support members being shown in their extreme frontward positions, the two left ski supported members being shown in their extreme rearward positions, and, for convenience of illustration, all four ski support members being shown midway between their extreme pivotal positions, it being understood that for the respective extreme frontward and rearward positions shown, the true pivotal positions of the ski support members are as shown in FIG. 4;

FIG. 4 is a sectional view taken generally along the line 4—4 of FIG. 3, but showing the true pivotal positions of the rear ski support members corresponding to their respective extreme frontward and rearward positions shown in FIG. 3;

FIG. 5 is a top view of the device of FIG. 1, the carriage being shown in its extreme rightward position, the two left ski support members being shown in their extreme frontward positions, the two right ski support members being shown in their extreme rearward positions, and, for convenience of illustration, all four ski support members being shown midway between their extreme pivotal positions, it being understood that for the respective extreme frontward and rearward positions shown, the true pivotal positions of the ski support members are as shown in FIG. 6;

FIG. 6 is a sectional view taken generally along the line 6—6 of FIG. 5, but showing the true pivotal positions of the rear ski support members corresponding to their respective extreme frontward and rearward positions shown in FIG. 5;

FIG. 7 is a sectional view taken generally along the line 7—7 of FIG. 1 and particularly showing the front support member of the carriage;

FIG. 8 is a sectional view taken generally along the line 8—8 of FIG. 1 and particularly showing the central support member for the coordinating lever;

FIG. 9 is a sectional view through the coordinating lever, taken generally along the line 9—9 of FIG. 1;

FIG. 9a is an enlarged view of the central portion of FIG. 9;

FIG. 10 shows a modification representing a preferred embodiment of my invention for beginning skiers and is a sectional view through the carriage looking toward a modified rear support member and a modified track member; and FIG. 11 is a sectional view taken generally along the line 11—11 of FIG. 10.

With reference to the drawings, a training device 18 constructed in accordance with my invention is intended to be supported on a horizontal floor when in use. The training device 18 includes a track member 20 and a carriage 22 the rear portion of which travels back and forth along the track member 20. The carriage 22 pivots about a front support member 24 thereof best shown in FIG. 7. More particularly, the carriage 22 pivots about a vertical axis disposed at the point of contact of a rounded bearing portion 24a of the front support member 24 with the floor.

Preferably the track member 20 is cast or molded in one piece and includes a platform portion 26 having at least one vertically extending curved track portion. In the embodiment of the invention shown, a pair of generally arcuately curved elongated track portions 27 and 28 extending vertically from the platform portion 26 are provided. The track portions 27 and 28 are generally concentric with the pivotal axis of the front support member 24, the track portion 28 being offset radially inwardly from, or having a smaller radius than, the track portion 27. An important thing to note about the track portions 27 and 28 is that they are oppositely inclined. Preferably the platform portion 26 is elongated and curved in the direction of the track portions 27 and 28, the track portion 27 starting adjacent a first end of the platform portion 26 and inclining upwardly toward the second end, the track portion 28 starting adjacent the second end of the platform portion 26 and inclining upwardly toward the first end, and the track portions 27 and 28 having substantially equal lengths and overlapping each other adjacent their higher ends in the central portion of the track member 20. A pair of upwardly extending stop portions 27a and 27b are provided adjacent opposite ends of the track portion 27, and a pair of upwardly extending stop portions 28a and 28b are provided adjacent opposite ends of the track portion 28.

The carriage 22 includes a rear support member 30 provided adjacent opposite ends with a pair of stud shafts or stub axles 31 and 32 upon which a pair of pulleys or wheels 33 and 34 are respectively rotatably mounted.

The wheels 33 and 34 are grooved respectively to receive the upper portions of the track portions 27 and 28 and roll therealong. The track member 20 may include a pair of apertured rib portions respectively adjacent the stop portions 27b and 28b, one rib portion 37 being shown adjacent the stop portion 27b in FIG. 2, and the stub axles 31 and 32 may be respectively provided with a pair of bent rods 39 (FIG. 2) and 40 (FIG. 1). As the carriage 22 reaches one of its extreme positions, the rod 39 is received in an aperture 37a in the rib portion 37 to prevent the wheel 33 from jumping off the track portion 27, and as the carriage 22 reaches the other of its extreme positions, the bent rod 40 is received in the rib portion (not shown) adjacent the stop portion 28b to prevent the wheel 34 from jumping off the track portion 28.

The carriage 22 includes a pair of generally parallel reversely bent shafts 42 and 44 respective rear end portions 42a and 44a of which are fixedly mounted in spaced relationship to each other in the rear support member 30 adjacent opposite ends of a raised central portion thereof between the wheels 33 and 34 and respective front end portions 42b and 44b of which are fixedly mounted in spaced relationship to each other in the front support member 24 adjacent the upper end thereof. Central portions 42c and 44c of the shafts 42 and 44 extend in spaced relationship to each other through a central support member 46 which is preferably formed in one piece, as best shown in FIG. 8, the shafts 42 and 44 being inserted through and secured in the central support member 46 before being bent. The rear portions 42a and 44a of the shafts 42 and 44 extend upwardly from the rear support member 30 respectively to the central portions 42c and 44c, the central portions 42c and 44c extend downwardly respectively from the rear end portions 42a and 44a through the central support member 46 to the front end portions 42b and 44b, and the front end portions 42b and 44b extend upwardly respectively from the central portions 42c and 44c to the front support member 24. In any particular position of the carriage 22, the shafts 42 and 44 are disposed on opposite sides of a plane containing the vertical pivotal axis of the front support member 24 and extending parallel to the shafts.

Each of the shafts 42 and 44 has a pair of ski support members mounted thereon for reciprocal and pivotal movement relatively thereto, a pair of rear ski support members 48a and 50a being mounted respectively on the rear end portions 42a and 44a of the shafts 42 and 44, and a pair of front ski support members 48b and 50b being mounted respectively on the front end portions 42b and 44b of the shafts 42 and 44. The ends of the shaft portions 42a and 44a supported in the rear support member 30 are higher than the ends of the shaft portions 42b and 44b supported in the front support member 24 to provide a downward slope to a pair of skis, as indicated by broken lines in FIG. 1. A left ski is mountable in the left ski support members 48a and 48b and a right ski is mountable in the right ski support members 50a and 50b, as indicated for the rear ski support members 48a and 50a by broken lines in FIG. 2. The left ski support members 48a and 48b are identical to each other, and the right ski support members 50a and 50b are identical to each other, but the left ski support members 48a and 48b differ from the right ski support members 50a and 50b in the angularity of the hole for receiving the respective shaft, it being evident that if the members 48a and 48b were reversed to the position of the members 50a and 50b, the angularity of the shaft receiving holes therein would be opposite to the angularity of the shafts.

The left ski support members 48a and 48b are tied together for movement as a unit by means of a connecting rod 52 having opposite end portions secured respectively in the members 48a and 48b and forming left ski support means therewith. Similarly, the right ski support members 50a and 50b are tied together for movement as a unit by means of a connecting rod 54 which may be identical to the connecting rod 52 and has opposite end portions secured respectively in the members 50a and 50b to form right ski support means therewith. First coordinating means are provided to insure that as the members 48a and 48b move in one direction respectively along the shaft portions 42a and 42b, members 50a and 50b move in the opposite direction respectively along the shaft portions 44a and 44b, and second coordinating means are provided to insure that as the members 48a-48b and 50a-50b move in opposite directions along their respective shaft portions, they will be pivoted in the same direction about their respective shaft portions, as can be noted from a comparison of FIGS. 3 and 4 with FIGS. 5 and 6. To this end, the central support member 46 is provided with a pair of oppositely extending forked end portions 46a and 46b, as shown in FIG. 8, which form the beforementioned second coordinating means and which respectively receive the connecting rods 52 and 54 and prevent radial movement thereof in a vertical direction while permitting the connecting rods to move axially as the members 48a, 48b, 50a, and 50b are moved along their respective shaft portions 42a, 42b, 44a, and 44b and accommodating sufficient radial movement of the connecting rods in a horizontal direction within the respective forked end portions 46a and 46b to prevent binding as the members 48a, 48b, 50a, and 50b are pivoted about their respective shaft portions 42a, 42b, 44a, and 44b. The translational movement of the ski support members 48a, 48b, 50a, and 50b upwardly and downwardly along their respective shaft portions 42a, 42b, 44a, and 44b, occurring while the respective connecting rods 52 and 54 are essentially prevented from moving vertically, causes the ski support members to pivot about their respective shaft portions 42a, 42b, 44a, and 44b. Because the members 48a and 48b translate simultaneously with but in an opposite direction from the direction of translation of the members 50a and 50b, as insured by the first coordinating means hereinafter described, the disposition of the connecting rods 52 and 54 respectively outwardly of the shafts 42 and 44 causes the members 48a, 48b, 50a, and 50b to pivot simultaneously in the same direction, as hereinafter more fully set forth. Further, while the members 48a, 48b, 50a, and 50b pivot about their respective shaft portions 42a, 42b, 44a, and 44b, they also pivot instantaneously about the axes of their respective connecting rods 52 and 54.

A bolt 56 (FIGS. 3, 5, 9, and 9a) carrying a flanged bushing 58 best shown in FIG. 9a is threaded into the central support member 46 between the shafts 42 and 44 and forwardly of the forked end portions 46a and 46b. Pivotally mounted on the flanged bushing 58 and above the connecting rods 52 and 54 is a coordinating lever 60 having a pair of oppositely extending forked end portions 60a and 60b which respectively receive the upper end portions of a pair of dogs 52a and 54a rigidly secured adjacent their lower ends respectively to the connecting rods 52 and 54. The lever 60 and the dogs 52a and 54a form the before-mentioned first coordinating means for insuring translational movement of the members 48a-48b and members 50a-50b simultaneously in opposite directions.

Each of the ski support members 48a, 48b, 50a, and 50b is provided with a bushing such as the bushings 62 shown in FIGS. 1, 4, and 6. Further, the members 48a, 48b, 50a, and 50b are designed to accommodate skis of different widths and thicknesses. Thus, each of the ski support members is provided with a stationary ski retaining portion inclined upwardly inwardly with respect to a ski mounted on the respective ski support member, such as the ski retaining portions 64 shown in FIGS. 2, 4, and 6, and with a threadedly adjustable clamping member 66 opposite the respective ski retaining portion 64 and having a cam portion 68 adjacent its upper end. The threaded portion of the clamping member 66 associated with the ski support member 50a is indicated by broken lines in FIG. 2.

The cam portion 68 of each clamping member has a cam surface 69 of varying radius and inclined upwardly inwardly with respect to a ski mounted on the respective ski support member, as shown in FIG. 2, rectangular cross sections of the skis being indicated by broken lines in FIG. 2. The clamping members 66 may be tightened to secure skis on the respective ski support members by means of a socket wrench (not shown) having a pair of projections receivable in a pair of eccentric recesses 70 (FIGS. 3 and 5) provided in each of the cam portions 68. Protective padding may be provided for the skis if desired, as indicated in FIG. 2 by broken lines.

The opposite end portions of the shaft 42 are preferably provided with a pair of rubber washers or hose sections 42d and 42e respectively adjacent the rear support member 30 and the front support member 24 to serve as bumpers or shock absorbers respectively for the ski support members 48a and 48b. Similarly, the opposite end portions of the shaft 44 are provided respectively with shock absorbers 44d and 44e for the ski support members 50a and 50b.

FIGS. 10 and 11 show a preferred construction for preventing a carriage from jumping off a track member. In this preferred embodiment of the invention, a modified rear support member 130 is provided with a depending follower arm 130a having a stud shaft 72 secured in a lower end portion thereof by a nut 73. A roll type follower 74 is mounted on the shaft 72 for engagement with the lower surface of a curved rail portion 121 of a modified track member 120.

It should be pointed out that an experienced skier may use the device of my invention without a track member such as the track member 20 or the track member 120 by allowing the wheels 33 and 34 to roll directly on the floor.

OPERATION

When a pair of skis are mounted respectively in the ski support members 48a, 48b, and 50a, 50b and a skiing trainee with skiing boots on his feet is standing on the mounted skis and has his ski boots clamped thereto, he may shift one foot forward and the other foot backward and at the same time temporarily shift his weight to the backward foot. The one of the wheels 33 and 34 adjacent the backward foot will thus temporarily have more weight placed thereon than is carried by the wheel adjacent the forward foot, and the wheel temporarily carrying the heavier load will be caused to roll downwardly along the respective one of the oppositely inclined curved track portions 27 and 28 while the wheel temporarily carrying the lighter load will be caused to roll upwardly along the respective one of the oppositely inclined curved track portions 27 and 28. The carriage 22 will thus be shifted to one of its extreme positions. The skiing trainee may then reversely shift his feet and weight to similarly cause the carriage 22 to roll to the other of its extreme positions on the track member 20. The shifting of the carriage 22 simulates turning on a skiing slope. FIG. 3 shows the position to which the carriage 22 is shifted when the left ski support members 48a and 48b are shifted backward and the load thereon is increased. FIG. 5 shows the position to which the carriage 22 is shifted when the right ski support members 50a and 50b are shifted backward and the load thereon is increased.

As can be readily understood, the connections between the coordinating lever 60 and the connecting rods 52 and 54 insure that as the ski support members 48a and 48b move in one direction along the shaft 42, the ski support members 50a and 50b move in the opposite direction along the shaft 44. The shifting of skis on the ski support members in opposite directions simulates changing the lead ski on a skiing slope. Further, as the ski support members 48a and 48b move along their respective shaft portions 42a and 42b oppositely to the direction of movement of the ski support members 50a and 50b along their respective shaft portions 44a and 44b, all four of the ski support members 48a, 48b, 50a, and 50b will be pivoted in the same direction to simulate edging of the skis on a ski slope. Thus, as the ski support members 48a and 48b move forward, the portions thereof adjacent their respective bushing 62 move upwardly along their respective shaft portions 42a and 42b, but the portions thereof adjacent the connecting rod 52 are prevented from moving upwardly by the vertical restraining effect of the forked end portion 46a of the central support member 46 on the connecting rod 52. Thus, as they move forward, the ski support members 48a and 48b pivot counter-clockwise when viewed from the rear, as indicated by the position of ski support member 48a in FIG. 6. At the same time, as the ski support members 50a and 50b move backward, the portions thereof adjacent their respective bushings 62 move downwardly along their respective shaft portions 44a and 44b, but the portions thereof adjacent the connecting rod 54 are prevented from moving downwardly by the vertical restraining effect of the forked end portion 46b of the central support member 46 on the connecting rod 54. Thus, as they move backward, the ski support members 50a and 50b pivot counterclockwise when viewed from the rear, as indicated by the position of ski support member 50a in FIG. 6, and in the same direction that the ski support members 48a and 48b pivot as they move forward. Conversely, as will be understood, all four ski support members 48a, 48b, 50a, and 50b pivot clockwise, when viewed from the rear, as the ski support members 48a and 48b move backward along their respective shaft portions 42a and 42b and the ski support members 50a and 50b move forward along their respective shaft portions 44a and 44b. The extreme clockwise position of the ski support members 48a and 50a is shown in FIG. 4.

Various modifications may be made in the structure shown and described without departing from the spirit and scope of the invention as set forth in the appended claims.

I claim:

1. A training device for teaching the art of skiing, said device comprising:
    (a) a carriage pivotable about a vertical axis, and
    (b) separate right and left ski support means disposed on opposite sides of a plane containing said vertical axis, said ski support means being reciprocally mounted on said carriage for translational movement parallel to said plane and being adapted respectively to support right and left skis in spaced relationship to said carriage.

2. A training device for teaching the art of skiing, said device comprising:
    (a) a front support member pivotable about a vertical axis,
    (b) a track member having a generally arcuately curved track portion disposed in spaced relationship to said front support member generally concentrically of said vertical axis,
    (c) a rear support member mounted on said curved track portion for movement about said vertical axis,
    (d) a pair of parallel shafts connecting said front and rear support members and disposed on opposite sides of a plane containing said vertical axis, and
    (e) separate right and left ski support means mounted respectively on said shafts for translational movement parallel to said plane.

3. A training device for teaching the art of skiing, said device comprising:
    (a) a front support member pivotable about a vertical axis,
    (b) a track member having a pair of generally arcuately curved track portions disposed in spaced relationship to said front support member generally concentrically of said vertical axis, said track portions having substantially equal arcuate lengths, being offset radially with respect to each other, being partially offset circumferentially with respect to each other to provide overlapping adjacent end portions, and being oppositely inclined downwardly from said overlapping adjacent end portions toward their remote end portions,
  (c) a rear support member supported for movement about said vertical axis on a pair of wheels mounted respectively on said track portions,
  (d) a pair of parallel shafts connecting said front and rear support members and disposed on opposite sides of a plane containing said vertical axis, and
  (e) separate right and left ski support means mounted respectively on said shafts for translational movement parallel to said plane.

4. A training device for teaching the art of skiing, said device comprising:
  (a) a front support member pivotable about a vertical axis,
  (b) a track member having a generally arcuately curved track portion disposed in spaced relationship to said front support member generally concentrically of said vertical axis,
  (c) a rear support member mounted on said curved track portion for movement about said vertical axis,
  (d) a pair of reversely bent parallel shafts disposed on opposite sides of a plane containing said vertical axis and having
     (1) rear end portions respectively mounted on said rear support member and extending upwardly therefrom toward said front support member,
     (2) front end portions respectively mounted on said front support member and extending downwardly therefrom toward said rear support member, and
     (3) central portions extending downwardly respectively from said rear end portions to said front end portions,
  (e) a pair of right and left front ski support members mounted respectively on said front end portions of said shafts for translational movement relatively thereto,
  (f) a pair of right and left rear ski support members mounted respectively on said rear end portions of said shafts for translational movement relatively thereto, and
  (g) a pair of right and left axially movable connecting rods respectively connecting said front and rear ski support members.

5. A training device for teaching the art of skiing, said device comprising:
  (a) a front support member pivotable about a vertical axis,
  (b) a track member having a pair of generally arcuately curved track portions disposed in spaced relationship to said front support member generally concentrically of said vertical axis, said track portions having substantially equal arcuate lengths, being offset radially with respect to each other, being partially offset circumferentially with respect to each other to provide overlapping adjacent end portions, and being oppositely inclined downwardly from said overlapping adjacent end portions toward their remote end portions,
  (c) a rear support member supported for movement about said vertical axis on a pair of wheels mounted respectively on said track portions,
  (d) a pair of reversely bent parallel shafts disposed on opposite sides of a plane containing said vertical axis and having
     (1) rear end portions respectively mounted on said rear support member and extending upwardly therefrom toward said front support member,
     (2) front end portions respectively mounted on said front support member and extending downwardly therefrom toward said rear support member, and
     (3) central portions extending downwardly respectively from said rear end portions to said front end portions,
  (e) a pair of right and left front ski support members mounted respectively on said front end portions of said shafts for translational movement relatively thereto,
  (f) a pair of right and left rear ski support members mounted respectively on said rear end portions of said shafts for translational movement relatively thereto, and
  (g) a pair of right and left axially movable connecting rods respectively connecting said front and rear ski support members.

6. For use with a carriage pivotable about a vertical axis, a track member including a pair of generally arcuately curved track portions disposed generally concentrically of said vertical axis in spaced relationship thereto, said track portions being offset radially with respect to each other, being partially offset circumferentially with respect to each other to provide overlapping adjacent end portions, and being oppositely inclined downwardly from said overlapping adjacent end portions toward their remote end portions.

7. A training device for teaching the art of skiing, said device comprising:
  (a) a front support member pivotable about a vertical axis,
  (b) a rear support member disposed in spaced relationship to said front support member for arcuate movement concentrically of said vertical axis,
  (c) a pair of parallel shafts connecting said front and rear support members and disposed on opposite sides of a plane containing said vertical axis, and
  (d) separate right and left ski support means mounted respectively on said shafts for translational movement parallel to said plane.

8. A training device for teaching the art of skiing, said device comprising:
  (a) a front support member pivotable about a vertical axis,
  (b) a rear support member disposed in spaced relationship to said front support member for arcuate movement concentrically of said vertical axis,
  (c) a pair of reversely bent parallel shafts disposed on opposite sides of a plane containing said vertical axis and having
     (1) rear end portions respectively mounted on said rear support member and extending upwardly therefrom toward said front support member,
     (2) front end portions respectively mounted on said front support member and extending downwardly therefrom toward said rear support member, and
     (3) central portions extending downwardly respectively from said rear end portions to said front end portions,
  (d) a pair of right and left front ski support members mounted respectively on said front end portions of said shafts for translational movement relatively thereto,
  (e) a pair of right and left rear ski support members mounted respectively on said rear end portions of said shafts for translational movement relatively thereto, and
  (f) a pair of right and left axially movable connecting rods respectively connecting said front and rear ski support members.

9. A training device as claimed in claim 1, wherein said ski support means are mounted on said carriage also for pivotal movement respectively about a pair of axes extending parallel to said plane on opposite sides thereof.

10. A training device as claimed in claim 1, including coordinating means insuring that said ski support means translate simultaneously in opposite directions.

11. A training device as claimed in claim 10, wherein said ski support means are mounted on said carriage also for pivotal movement respectively about a pair of axes extending parallel to said plane on opposite sides thereof.

12. A training device as claimed in claim 10, wherein said ski support means are mounted on said carriage also for pivotal movement respectively about a pair of axes extending parallel to said plane on opposite sides thereof, and including second coordinating means insuring that said ski support means pivot simultaneously in the same rotary direction while translating in opposite linear directions.

13. A training device as claimed in claim 2, wherein said ski support means are mounted respectively on said shafts also for pivotal movement respectively about a pair of axes extending parallel to said plane on opposite sides thereof.

14. A training device as claimed in claim 2, including coordinating means insuring that said ski support means translate simultaneously in opposite directions.

15. A training device as claimed in claim 14, wherein said ski support means are mounted respectively on said shafts also for pivotal movement respectively about a pair of axes extending parallel to said plane on opposite sides thereof.

16. A training device as claimed in claim 14, wherein said ski support means are mounted respectively on said shafts also for pivotal movement respectively about a pair of axes extending parallel to said plane on opposite sides thereof, and including second coordinating means insuring that said ski support means pivot simultaneously in the same rotary direction while translating in opposite linear directions.

17. A training device as claimed in claim 3, wherein said ski support means are mounted respectively on said shafts also for pivotal movement respectively about a pair of axes extending parallel to said plane on opposite sides thereof.

18. A training device as claimed in claim 3, including coordinating means insuring that said ski support means translate simultaneously in opposite directions.

19. A training device as claimed in claim 18, wherein said ski support means are mounted respectively on said shafts also for pivotal movement respectively about a pair of axes extending parallel to said plane on opposite sides thereof.

20. A training device as claimed in claim 18, wherein said ski support means are mounted respectively on said shafts also for pivotal movement respectively about a pair of axes extending parallel to said plane on opposite sides thereof, and including second coordinating means insuring that said ski support means pivot simultaneously in the same rotary direction while translating in opposite linear directions.

21. A training device as claimed in claim 4, wherein said front ski support members are mounted respectively on said front end portions of said shafts also for pivotal movement relatively thereto, said rear ski support members are mounted respectively on said rear end portions of said shafts also for pivotal movement relatively thereto, and said connecting rods are also pivotally movable.

22. A training device as claimed in claim 4, including coordinating means insuring that said right and left connecting rods and their respective front and rear ski support members translate simultaneously in opposite directions.

23. A training device as claimed in claim 22, wherein said front ski support members are mounted respectively on said front end portions of said shafts also for pivotal movement relatively thereto, said rear ski support members are mounted respectively on said rear end portions of said shafts also for pivotal movement relatively thereto, and said connecting rods are also pivotally movable.

24. A training device as claimed in claim 22, wherein said front ski support members are mounted respectively on said front end portions of said shafts also for pivotal movement relatively thereto, said rear ski support members are mounted respectively on said rear end portions of said shafts also for pivotal movement relatively thereto, and said connecting rods are also pivotally movable, and including second coordinating means insuring that said right and left connecting rods and their respective front and rear ski support members pivot simultaneously in the same rotary direction while translating in opposite linear directions.

25. A training device as claimed in claim 22, including a central support member supported on said central portions of said shafts, and wherein said coordinating means includes a coordinating lever pivotally mounted centrally thereof on said central support member and operatively connected adjacent opposite ends respectively to said connecting rods.

26. A training device as claimed in claim 24, including a central support member supported on said central portions of said shafts, and wherein said first coordinating means includes a coordinating lever pivotally mounted centrally thereof on said central support member and operatively connected adjacent opposite ends respectively to said connecting rods, and said second coordinating means includes means adjacent opposite ends of said central support member preventing vertical movement respectively of said connecting rods radially thereof.

27. A training device as claimed in claim 5, wherein said front ski support members are mounted respectively on said front end portions of said shafts also for pivotal movement relatively thereto, said rear ski support members are mounted respectively on said rear end portions of said shafts also for pivotal movement relatively thereto, and said connecting rods are also pivotally movable.

28. A training device as claimed in claim 5, including coordinating means insuring that said right and left connecting rods and their respective front and rear ski support members translate simultaneously in opposite directions.

29. A training device as claimed in claim 28, wherein said front ski support members are mounted respectively on said front end portions of said shafts also for pivotal movement relatively thereto, said rear ski support members are mounted respectively on said rear end portions of said shafts also for pivotal movement relatively thereto, and said connecting rods are also pivotally movable.

30. A training device as claimed in claim 28, wherein said front ski support members are mounted respectively on said front end portions of said shafts also for pivotal movement relatively thereto, said rear ski support members are mounted respectively on said rear end portions of said shafts also for pivotal movement relatively thereto, and said connecting rods are also pivotally movable, and including second coordinating means insuring that said right and left connecting rods and their respective front and rear ski support members pivot simultaneously in the same rotary direction while translating in opposite linear directions.

31. A training device as claimed in claim 28, including a central support member supported on said central portions of said shafts, and wherein said coordinating means includes a coordinating lever pivotally mounted centrally thereof on said central support member and operatively connected adjacent opposite ends respectively to said connecting rods.

32. A training device as claimed in claim 30, including a central support member supported on said central portions of said shafts, and wherein said first coordinating means includes a coordinating lever pivotally mounted centrally thereof on said central support member and operatively connected adjacent opposite ends respectively to said connecting rods, and said second coordinating means includes means adjacent opposite ends of said central support member preventing vertical movement respectively of said connecting rods radially thereof.

33. A training device as claimed in claim 7, wherein said ski support means are mounted respectively on said shafts also for pivotal movement respectively about a pair of axes extending parallel to said plane on opposite sides thereof.

34. A training device as claimed in claim 7, including coordinating means insuring that said ski support means translate simultaneously in opposite directions.

35. A training device as claimed in claim 34, wherein said ski support means are mounted respectively on said shafts also for pivotal movement respectively about a pair of axes extending parallel to said plane on opposite sides thereof.

36. A training device as claimed in claim 34, wherein said ski support means are mounted respectively on said shafts also for pivotal movement respectively about a pair of axes extending parallel to said plane on opposite sides thereof, and including second coordinating means insuring that said ski support means pivot simultaneously in the same rotary direction while translating in opposite linear directions.

37. A training device as claimed in claim 8, wherein said front ski support members are mounted respectively on said front end portions of said shafts also for pivotal movement relatively thereto, said rear ski support members are mounted respectively on said rear end portions of said shafts also for pivotal movement relatively thereto, and said connecting rods are also pivotally movable.

38. A training device as claimed in claim 8, including coordinating means insuring that said right and left connecting rods and their respective front and rear ski support members translate simultaneously in opposite directions.

39. A training device as claimed in claim 38, wherein said front ski support members are mounted respectively on said front end portions of said shafts also for pivotal movement relatively thereto, said rear ski support members are mounted respectively on said rear end portions of said shafts also for pivotal movement relatively thereto, and said connecting rods are also pivotally movable.

40. A training device as claimed in claim 38, wherein said front ski support members are mounted respectively on said front end portions of said shafts also for pivotal movement relatively thereto, said rear ski support members are mounted respectively on said rear end portions of said shafts also for pivotal movement relatively thereto, and said connecting rods are also pivotally movable, and including second coordinating means insuring that said right and left connecting rods and their respective front and rear ski support members pivot simultaneously in the same rotary direction while translating in opposite linear directions.

References Cited

UNITED STATES PATENTS

| 1,118,658 | 11/1914 | Laun et al. | 104—44 |
| 2,274,081 | 2/1942 | Mautin | 272—57 |
| 2,455,274 | 11/1948 | Scriver | 272—57 |
| 2,536,381 | 1/1951 | Mackey | 74—567 |
| 2,657,055 | 10/1953 | Denham | 272—57 |
| 2,772,881 | 12/1956 | Fundom | 272—57 X |

FOREIGN PATENTS

| 632,029 | 12/1961 | Canada. |
| 710,685 | 6/1965 | Canada. |

ARTHUR L. LA POINT, *Primary Examiner.*

D. F. WORTH, *Examiner.*